L. A. FREEDMAN.
REMOVABLE SEAT FOR AUTOMOBILES.
APPLICATION FILED JUNE 17, 1914.
1,210,789.
Patented Jan. 2, 1917.
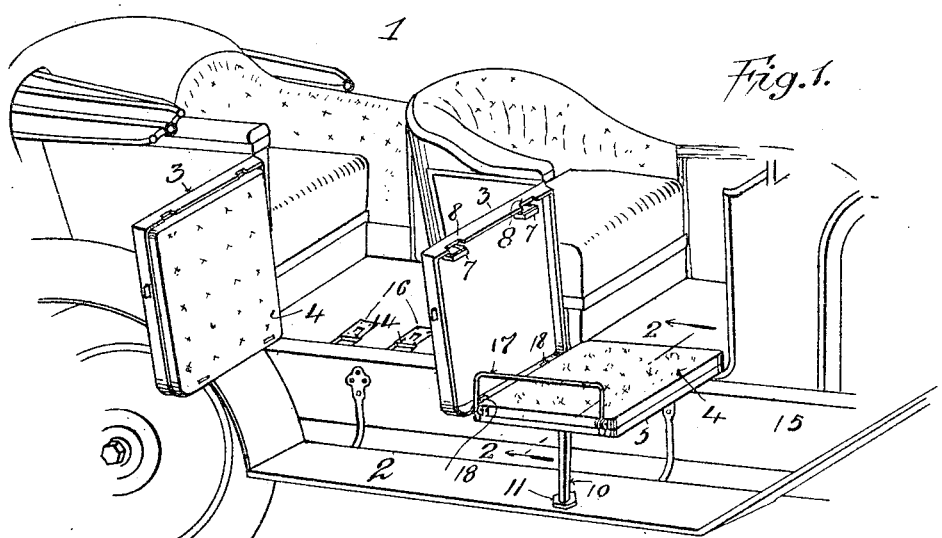
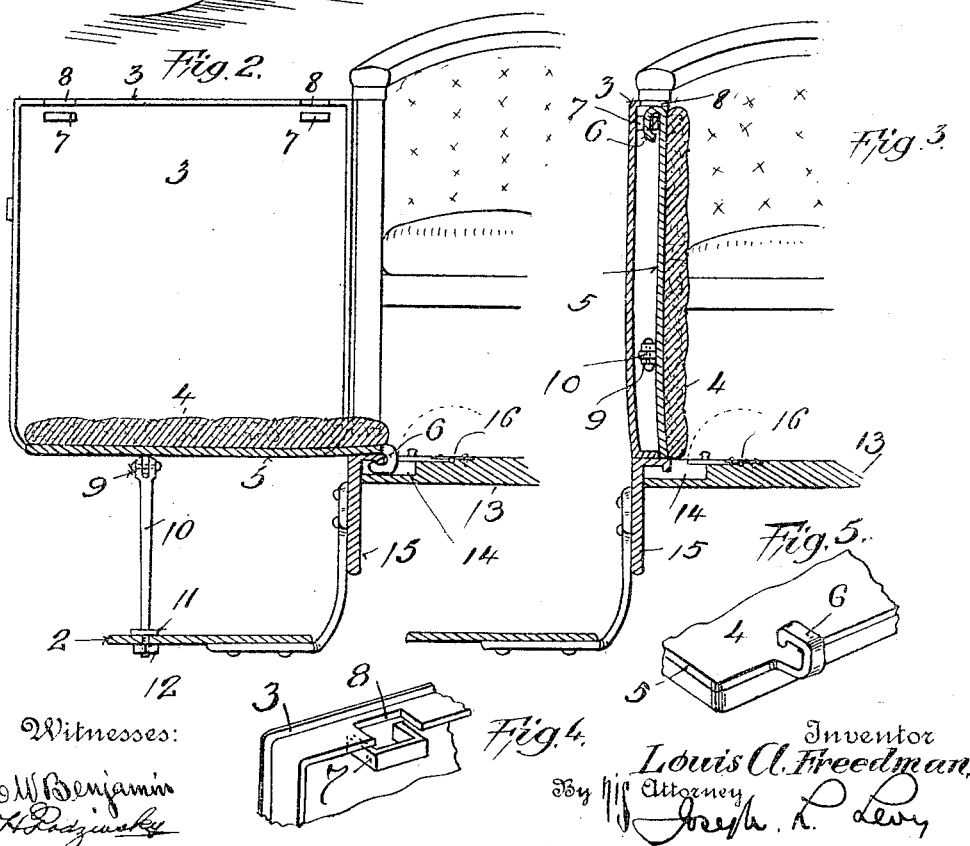
Witnesses:
Inventor
Louis A. Freedman,
By his Attorney

UNITED STATES PATENT OFFICE.

LOUIS A. FREEDMAN, OF NEW YORK, N. Y.

REMOVABLE SEAT FOR AUTOMOBILES.

1,210,789.      Specification of Letters Patent.      Patented Jan. 2, 1917.

Application filed June 17, 1914. Serial No. 845,552.

*To all whom it may concern:*

Be it known that I, LOUIS A. FREEDMAN, a citizen of the United States, and a resident of the city, county, and State of New York, (whose post-office address is 135 West Eighty-sixth street, New York city,) have invented a new and useful Improvement in Removable Seats for Automobiles, of which the following is a specification.

The object of my invention is to provide a seat which may be placed over the running board or step, when desired, and which may also be folded into a door, when not in use, so that the seat may be available at all times and used when desired. This object is accomplished by my invention, one embodiment of which is hereinafter set forth.

For a more particular description of my invention, reference is to be had to the accompanying drawing, forming a part hereof, in which—

Figure 1 shows an automobile provided with my improvement; Fig. 2 is a sectional view, taken on the line 2—2 of Fig. 1, looking in the direction of the arrows; Fig. 3 is a sectional view of the seat in the position which it normally occupies when not in use; and Figs. 4 and 5 show an eye and hook for securing the seat in place, the hook also serving when the seat is in use.

Throughout the various views of the drawings, similar reference characters designate similar parts.

An automobile 1 embodying my invention is provided with the usual step or running board 2, which is supported in any desired manner. It is also provided with front and rear doors 3 which, for the purposes of this case may be considered as identical, so that a description of one will answer for both. Each door 3 is provided with a removable panel 4, which is preferably cushioned at the exposed surface and provided with a rigid back 5 on its concealed surface when the same is in the door, as shown in Fig. 3. The upper end of the back 5 is provided with two hooks 6 which are adapted to engage corresponding eyes 7 fixed to the upper edge of each door 3, and this upper edge is recessed at 8 so as to permit these hooks to enter their respective eyes and hold the seat 4 in proper position. The back 5 has a lug 9 projecting laterally therefrom and to this is secured a leg 10 with a collar 11 near its free end. Beyond this collar 11 this leg is screwthreaded so as to receive a suitable nut 12, which is secured thereto below the running board when the parts are as shown in Fig. 2, the running board being provided with a suitable perforation to permit the leg 10 to pass through it so that when the nut 12 is in place the step 2 is firmly held to the leg 10 between the collar 11 and the nut 12.

The floor 13 of an automobile provided with my improvement is recessed at 14 to permit the hook 6 to enter this recess 14 and pass under a lip of a side sill 15 whereby this hook is secured in place. A small hinge 16 extends over the inner edge of the recess 14 and serves the double function of concealing this recess as shown in Fig. 3, and preventing the hook 6 from disengaging the sill 15, as shown in Fig. 2.

If desired, a small railing 17 may be placed at the outer edge of the seat 4. This railing is preferably hinged to the back 5 so that it can lie against the same, or against the upholstering of the seat 4, as desired, when the seat is in the position shown in Fig. 3. It is obvious, in view of the foregoing, that the extra seat 4 may be placed as shown in Fig. 3, and then the automobile looks like any ordinary machine of this character. If, for any reason, it is necessary to provide additional seats, each seat 4 may be taken from its door 3 and the door thrown wide open. The plate 5 of each seat is then secured, as shown in Fig. 2, that is, by having the hooks 6 engage the sill 15, and the leg 10 the step 2, as above described. When there is no further use for the seat it may be restored to the position shown in Fig. 3. While in use, as shown in Fig. 2, the door 3 may be used as a back by securing the plate 5 and door 3 together in any suitable manner, as indicated by a latch hook 18.

While I have shown and described one embodiment of my invention, it is obvious that it is not restricted thereto, but is broad enough to cover all structures that come within the scope of the annexed claims.

What I claim is:—

1. A device of the class described comprising an automobile body having a door, said door having an open side, a seat normally carried in said open side, means in said open side coöperating with means on the seat for holding said seat in the open side of the door and means on the seat adapted to engage means on the floor, door and step of the automobile and support the seat when said seat is removed from the open side of the door.

2. A device of the class described comprising an automobile body having a door, the inner side of said door being open for the reception of a seat, a seat detachably secured in the open side of said door and normally held therein, fixtures on the edge of the seat for securing said seat to the floor of the automobile and to the lower end of the door, and a rod extending from the seat to the step of the automobile for supporting said seat.

3. In a device of the class described, a door with eyes at its upper end, a floor with recesses and a seat with hooks adapted to engage either said eyes or the walls of said recesses, a step, and means for securing said seat and step together and a means for fastening said door and seat together.

4. In a device of the class described, a door with fixtures, a floor with fixtures and a step fixture and a seat with correspondingly located fixtures so adapted that the seat may be either secured to the door or to the floor and step by engaging their respective fixtures, and a means for fastening said door and seat together.

Signed at the city of New York, county of New York, and State of New York, this 4th day of June, 1914.

LOUIS A. FREEDMAN.

Witnesses:
H. RODZINSKY,
ARTHUR McNALLY.

Copies of this patent may be obtained for five cents each, by addressing the "Commissioner of Patents, Washington, D. C."